INVENTORS
SAMUEL BELCHIS
GEORGE R. GAMERTSFELDER

BY

ATTORNEY.

INVENTORS
SAMUEL BELCHIS
GEORGE R. GAMERTSFELDER

BY

ATTORNEY.

United States Patent Office 3,288,018
Patented Nov. 29, 1966

3,288,018
OPTICAL CORRELATOR HAVING MEANS TO LINEARLY DISTRIBUTE CENTER OF ILLUMINATION
Samuel Belchis, Hartsdale, and George R. Gamertsfelder, Pleasantville, N.Y., assignors to General Precision, Inc., a corporation of Delaware
Filed July 12, 1963, Ser. No. 294,711
6 Claims. (Cl. 88—1)

This invention relates generally to optical correlators and particularly to apparatus for distinguishing the correlation function from background illumination.

Optical correlation techniques are directed, in general, to the problem of matching or bringing into registration two areas containing essentially the same pictorial content. The simplest example occurs when one is required to rotate and translate one of a pair of identical transparencies until it is in perfect registration with the other member of the pair. Placing such a pair of transparencies in contact, holding them up to the light and shifting one with respect to the other, the viewer will observe maximum light transmitted through the pair when best registration is achieved. Strictly speaking, what will be observed is that when the two transparencies are misaligned from best registration by a small amount, whether by displacement or rotation or both, the amount of light transmitted through the pair is reduced. It is this effect which is at the heart of optical area correlation techniques. A converging lens and a photodetector at its focus aids in determining the condition of best registration.

A similar situation occurs when the two transparencies are separated by a significant distance and light is transmitted through both and through a converging lens to a detecting plane. It is found that again maximum light is transmitted when best registration is achieved. It is also observed that, at best registration, the focal point exhibits a bright spot, called the correlation spot. When one transparency is translated without rotation, the correlation spot is correspondingly translated. Rotation of one transparency about the optical axis causes a blurring of the correlation spot which, upon continued rotation, completely disappears into the background.

As will be more fully explained, the light forming the correlation spot is not the only light reaching the detecting plane, but the entire area is more or less brightly illuminated. This other illumination, called background illumination, seriously interferes with the detection of the correlation spot, especially since some portions of the detecting plane may have a greater intensity of illumination than the correlation spot. Accordingly, it is desirable to find a way to detect the correlation spot free from the interfering effects of background illumination.

One solution to the problem proposed in the past requires that one of the transparencies be oscillated continuously about the optical axis. This solution is fully described in the copending application of George R. Gamertsfelder et al., Serial Number 275,475, filed April 22, 1963, for Image Correlator, and assigned to the same assignee, as is the instant application. As described in the cited application, it has been discovered that such oscillation causes the correlation spot to be diffused into the background illumination while the background illumination remains substantially unaffected. A radiation detector in the detecting plane therefore generates signals having alternating components representing the correlation function which components can be detected and utilized to measure or correct any misalignment. This solution to the problem has many advantages but is subject to the obvious mechanical problems inherently connected with oscillatory or reciprocating motion.

Another solution proposed in the past involves rotating a half diffusing, half nondiffusing disk of uniform average transmission in front of the radiation detector. This solution is fully described in the copending application of Lester I. Goldfischer, Serial Number 290,881, filed June 21, 1963, for Optical Correlator, which application is also assigned to the same assignee as is the instant application. As described in the last cited application, the disk causes the radiation detector to generate signals having alternating components which components may be detected and used to measure or correct misalignment. This solution to the problem also has many advantages but is subject to the difficulty that it is necessary to match the average transmission through the diffusing and nondiffusing sectors. To the extent that this is not accomplished with precision, spurious signals are produced by fluctuating background illumination.

It is a general object of the present invention to provide an improved optical correlator.

Another object is to provide a correlator in which the correlation spot is distinguished from the background illumination without the above mentioned disadvantages.

Briefly stated, the invention uses a continuously rotating one-dimensional diffusing element such as a diffraction grating positioned on the optical axis in front of the detecting plane. This element diffuses or "smears" the power at any point symmetrically along a line. Since the correlation spot is a sharp peak, approaching a point more closely than the background illumination, the correlation spot is diffused to a much greater extent than is the background illumination. As the element rotates, the center of power of the correlation spot appears to rotate, causing the radiation sensor in the detecting plane to generate voltages having alternating components at twice the rotational frequency. These voltages are synchronously detected to generate error signals representing the position of the nondiffused correlation spot with respect to the center of the sensitive area of the radiation sensor.

For a clearer understanding of the invention, reference may be made to the following detailed description and the accompanying drawing, in which.

Figure 1:
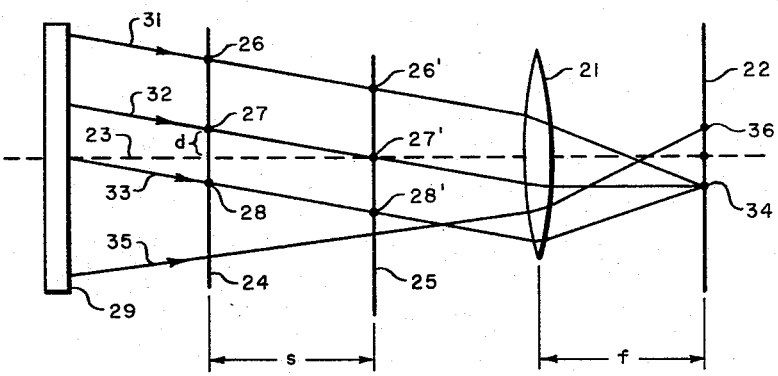
FIGURE 1 is a schematic diagram illustrating some principles of operation of correlators.

Referring first to FIG. 1, there is shown a lens 21 having a focal length $f$. A detecting plane 22 is shown in edge view perpendicular to the optical axis 23 a distance $f$ from the lens 21. Two substantially identical variable density transparencies 24 and 25 are shown in edge view, perpendicular to the optical axis 23 and spaced apart a distance $s$. The two transparencies are not positioned identically with respect to the optical axis 23 but rather corresponding points are displaced from each other by a distance $d$. The points 26, 27 and 28 on the transparency 24 correspond to the points 26', 27' and 28' respectively on the transparency 25. Also shown schematically is a uniform light source 29.

Parallel bundles of rays, such as the rays 31, 32 and 33, passing through corresponding points on the two transparencies are converged by the lens 21 to a point 34, thereby forming the correlation spot. If the relative positions of the transparencies 24 and 25 were changed, the correlation spot would shift in position. For example, if the transparency 25 were moved upward, the correlation spot 34 would move upward a corresponding amount.

The light which forms the correlation spot is not the only light to reach the detecting plane 22. Other parallel bundles of rays making other angles with the optical axis pass through both transparencies and are brought to a focus on the detecting plane 22. For example, the ray 35 and rays parallel thereto are focussed at the point 36. Other rays are focussed at other points with the result that the entire detecting plane is illuminated to some extent.

Figure 2:
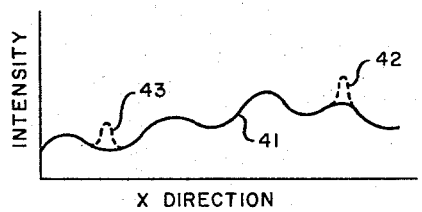
FIGURE 2 is a graph useful in explaining the invention.

The transparencies ordinarily encountered have transmissivities which vary randomly over the surface and, accordingly, the intensity of illumination on the detecting plane varies in a similar manner. FIG. 2 shows a typical variation in intensity for a two-dimensional case. The curve 41 represents the intensity due to all rays except those forming the correlation spot. The correlation spot intensity is superimposed upon this background illumination and may occur at a peak, as shown by the dashed curve 42, or at a valley, as shown by the dashed curve 43. Thus it is seen that the correlation spot is not necessarily the point of greatest intensity and it is highly desirable to provide a way to minimize the effect of background illumination, that is, to increase the contrast between the correlation spot and the background illumination.

Figure 3:
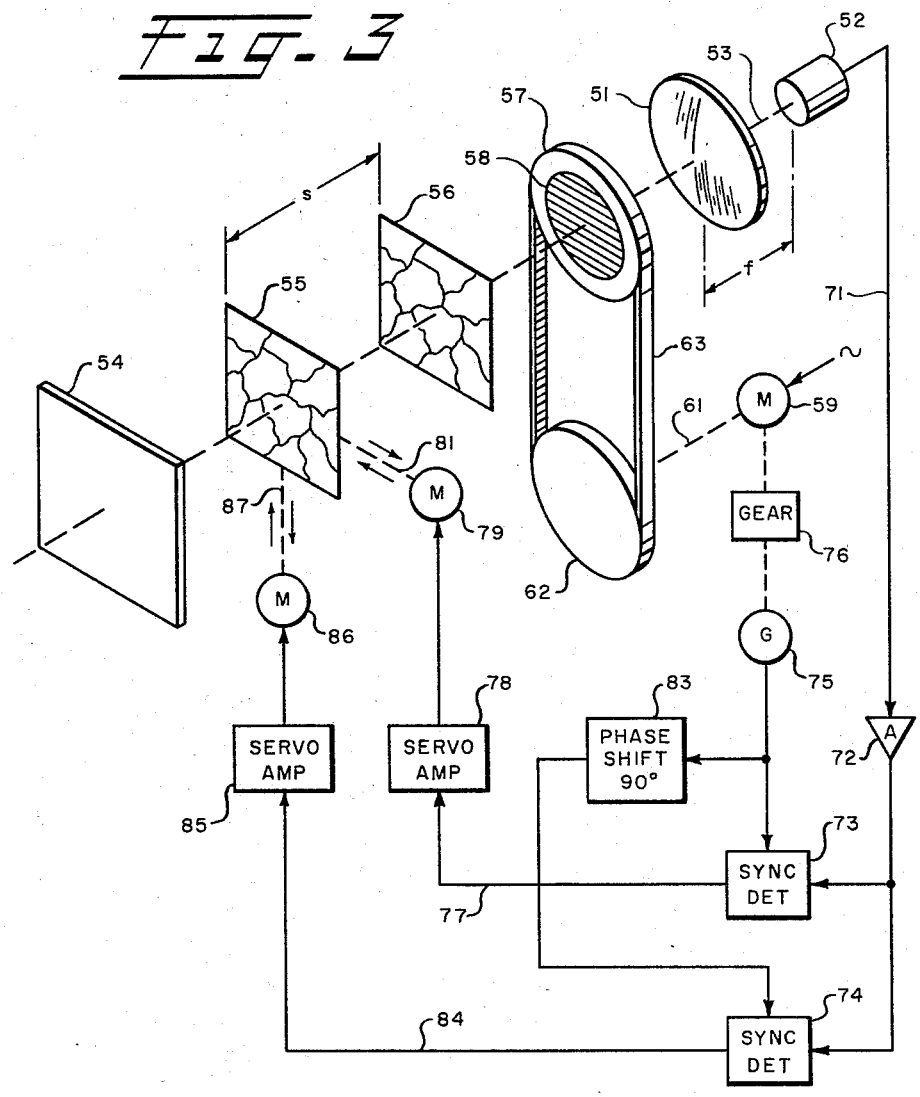
FIGURE 3 is a schematic diagram of a correlator utilizing the present invention.

Referring now to FIG. 3, there is shown a converging lens 51. A radiant energy sensor 52 is positioned on the optical axis 53 at the focal distance $f$ from the lens 51. A diffuse light source 54 is also positioned on the optical axis 53 but on the side of the lens 51 opposite to the radiant energy sensor 52. Between the source 54 and the lens 51 are two substantially identical variable density transparencies 55 and 56, each representing the same scene. The transparencies 55 and 56 are parallel to each other, perpendicular to the optical axis 53, and spaced apart a distance $s$. Between the transparency 56 and the lens 51 is a one-dimensional diffusing element 57.

FIG. 3 is obviously a schematic drawing and is, in part, an "exploded" view. The transparencies 55 and 56 are spaced apart a significant distance $s$ and the sensor 52 is placed a distance $f$ from the lens 51. However, the other parts are preferably close together, that is, the source 54 is close to the transparency 55, the diffuser 57 is close to the transparency 56, and the lens 51 is close to the diffuser 57.

Neglecting for a moment the effect of the diffusing element 57, when the transparencies 55 and 56 are aligned with each other in both translation and rotation, the correlation spot appears at the center of the sensor 52, on the optical axis. However, as previously discussed, this point may not be the point of maximum light intensity and it is the purpose of the diffusing element 57 to aid in determining the position of the correlation spot in spite of the background illumination. The element 57 is a one-dimensional diffuser which "smears" the power at a point symmetrically over a line through the point. The central portion of the element 57 is a diffraction grating 58 comprising alternate transparent and opaque lines of equal width. In one embodiment, the grating 58 was 980-line-per-inch Ronchi Ruling, made photographically on film from a commercially available 133-line-per-inch glass plate master. The grating 58 diffuses the light intensity in a direction perpendicular to the grating lines. The element 57 is assumed to be mounted in suitable bearings (not shown) and is rotated continuously at a substantially constant speed by an electric motor 59. The driving connections are shown schematically as comprising a shaft 61 connecting the motor 59 to a pulley 62 and a toothed timing belt 63 engaging both the pulley 62 and the element 57.

Figure 4:
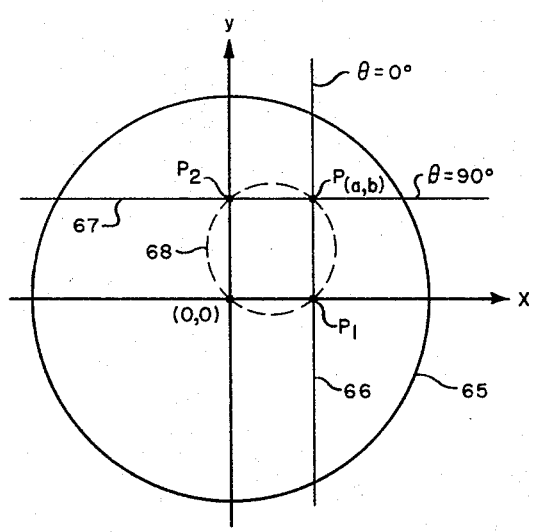
FIGURE 4 is a diagram useful in explaining the invention.

Referring now to FIG. 4, the circle 65 represents the outline of the sensitive area of the radiation sensor 52. Let the center be the origin of rectangular coordinates $x, y$. Consider the case when one of the transparencies, for example, the transparency 55, is not aligned with the other but is displaced in both the $x$ and $y$ directions.

In the absence of the diffusing element 57, the correlation spot appears at some point P having coordinates $(a, b)$. With the diffusing element in place and with the rulings parallel to the $x$ axis, the power of the correlation spot is diffused or "smeared" symmetrically along a line 66 perpendicular to the rulings. The center of power of the correlation spot is shifted from P $(a, b)$ to $P_1$ $(a, O)$. When the diffusing element 57 is rotated ninety degrees, the power is diffused along the line 67 and the center of power of the correlation spot is shifted to point $P_2$ $(O, b)$. When the diffusing element 57 is rotated continuously, the center of power appears to rotate around the dashed circle 68, one of whose diameters extends from $(O, O)$ to $(a, b)$. In general, the center of power $(x_1, y_1)$ for counter-clockwise rotation $\theta$ of the element 57, regarding $\theta=0$ when the rulings are parallel to the $x$ axis, can be expressed as $$x_1 = a/2 + a/2 \cos 2\theta + b/2 \sin 2\theta \qquad (1)$$
$$y_1 = b/2 + a/2 \sin 2\theta - b/2 \cos 2\theta \qquad (2)$$

The correlation spot itself has a maximum intensity at its center, is symmetrical, and is quite sharp, while the background illumination varies more gradually in intensity. It has been found that the correlation spot is diffused by the element 57 to a much greater extent than is the background illumination. Accordingly, the variations of intensity at any given point are much greater for the correlation spot than for the background illumination, making it possible to determine the location of the correlation spot much more effectively by detecting these variations than would be possible without the element 57.

The radiation sensor 52 is preferably of the kind which generates two unidirectional voltages having amplitudes and polarities indicative of the power and position, in orthogonal directions, of the centroid of incident radiation, both of these voltages being zero when the centroid of illumination is at the center of the sensitive area. One such sensor suitable for use in the present invention is designated a Radiation Tracking Transducer, Model XY20B, manufactured by Micro Systems, Inc., San Gabriel, California. The sensor 52 is oriented so that the two above mentioned voltages are indicative of the displacement of the centroid of power in the $x$ and $y$ directions.

Considering Equations 1 and 2 in connection with the characteristics of the radiation sensor 52, it is apparent that either the $x$ or the $y$ signal alone contains the information necessary to generate signals indicative of the coordinates of the nondiffused center of intensity. Such signals are generated by the apparatus of FIG. 3 and are used to align the transparency 55.

Referring again to FIG. 3, the conductor 71 connected to the radiation sensor 52 carries one of the signals, for example, the $x$ signal. After amplification by an amplifier 72, the signal is led to two synchronous detectors 73 and 74. A generator 75 is driven by the motor 59 through a gear box 76 of suitable ratio so as to generate an alternating voltage the frequency of which is equal to twice the rotational frequency of the diffusing element 57. This voltage controls the synchronous detector 73 so that its output on the conductor 77 is a unidirectional voltage representing, by its polarity and magnitude, the direction and extent of the deviation in the $x$ direction of the undiffused correlation spot from the center of the sensitive area of the sensor 52. This voltage controls a servo amplifier 78 which in turn controls a motor 79 which drives a suitable mechanism, shown schematically by the dashed line 81, so as to position the transparency 55 in the $x$ direction until the error signal on the conductor 77 vanishes.

The $y$ coordinate distance $y_1$ of the nondiffused center of intensity varies in quadrature with the $x$ coordinate $x_1$, as is apparent from Equations 1 and 2. To derive a suitable error signal, the voltage from the generator 75 is passed through a phase shifter 83 which shifts its phase by 90°. The resulting voltage controls the synchronous detector 74 so as to develop, on the conductor 84, an error signal indicative of the misalignment in the y direction. This error signal controls a servo amplifier 85 which in turn controls a motor 86 which is mechanically connected through a suitable mechanism, shown schematically by the dashed line 87, to position the transparency 55 in the y direction.

Figure 5:
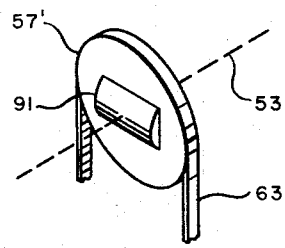
FIGURE 5 is a schematic diagram of a modification of the invention.

Referring now to FIG. 5, there is shown schematically an alternative form for linearly distributing the light. As shown, the active portion of the light distributing element 57' comprises a cylindrical lens 91 which distributes the light in a direction normal to the cylindrical axis. This element can be used in place of the element 57 of FIG. 3 and operation is substantially the same as previously described. However, at present the grating 58 is preferred because, being on film, it is easier to rotate and because it contains no optic axis requiring centering in the rotating mechanism.

Although a preferred embodiment has been described for illustrative purposes, many modifications can be made within the spirit of the invention. For example, many of the principles discussed are applicable to the so-called "lensless" correlators in which one of the areas is a small scale version of the other, such as a photograph of an actual scene, and in which no lenses are required to form the correlation spot. Many other modifications will occur to those skilled in the art. It is therefore desired that the protection afforded by Letters Patent be limited only by the true scope of the appended claims.

What is claimed is:
1. An optical correlator, comprising,
an illuminated object,
a variable density transparency representative of said object positioned substantially parallel thereto but spaced therefrom,
a radiation sensor for generating a voltage the polarity and magnitude of which are indicative of the direction and extent of the deviation of the centroid of illumination from the center thereof in one of two orthogonal directions,
said sensor being positioned to receive light transmitted from each point on said body through corresponding points on said transparency,
means for linearly distributing the centroid of illumination positioned between said transparency and said sensor, and
means for rotating said linearly distributing means continuously,
whereby the voltage generated by said sensor contains alternating components indicative of the translational misalignment between said body and said transparency.

2. An optical correlator, comprising,
an illuminated object,
a variable density transparency representative of said object positioned substantially parallel thereto but spaced therefrom,
a positive lens positioned to that side of said transparency which is remote from said object and oriented with its optic axis substantially perpendicular to said transparency,
a radiation sensor for generating a voltage the polarity and magnitude of which are indicative of the direction and extent of the displacement of the centroid of illumination from the center thereof in one of two orthogonal directions,
said sensor being positioned on said optic axis to the side of said lens remote from said transparency and in the focal plane of said lens,
means for linearly distributing the centroid of illumination positioned between said transparency and said lens, and
means for rotating said linearly distributing means continuously,
whereby the voltage generated by said sensor contains alternating components indicative of the translational misalignment between said body and said transparency.

3. An optical correlator, comprising,
first and second variable density transparencies having substantially the same pictorial content to the same scale,
said transparencies being positioned parallel to each other in spaced apart relationship,
a light source adjacent to said first transparency on that side remote from said second transparency,
a converging lens positioned to that side of said second transparency which is remote from said first transparency,
said lens being oriented with its optic axis perpendicular to said transparencies,
a radiation sensor positioned on said optic axis to the side of said lens which is remote from said transparencies and at a distance from said lens equal to the focal length thereof,
said sensor being for generating a voltage the polarity and magnitude of which are indicative of the direction and extent of the displacement of the centroid of illumination in one of two orthogonal directions from the center of said sensor,
means for linearly distributing the centroid of illumination positioned on said optic axis between said second transparency and said lens, and
means for rotating said linearly distributing means continuously,
whereby the voltage generated by said sensor contains alternating components indicative of the translational misalignment of said first and second transparencies.

4. Apparatus according to claim 3 in which said linearly distributing means is a cylindrical lens.

5. Apparatus according to claim 3 in which said linearly distributing means is a diffraction grating.

6. Apparatus according to claim 3 further comprising means responsive to said components for correcting translational misalignment of said transparencies.

References Cited by the Examiner

UNITED STATES PATENTS 3,234,845  2/1966  Stavis _____ 88—1

JEWELL H. PEDERSEN, *Primary Examiner.*

JOHN K. CORBIN, DAVID H. RUBIN, *Examiners.*